United States Patent

[11] 3,584,748

[72] Inventors Peter W. Enfield;
  Donald F. Darden, both of Spokane, Wash.
[21] Appl. No. 850,086
[22] Filed Aug. 14, 1969
[45] Patented June 15, 1971
[73] Assignee Atlas Spokane, Inc.
  Spokane, Wash.

[54] BULK MATERIAL RECLAIMING APPARATUS
12 Claims, 12 Drawing Figs.
[52] U.S. Cl. .................................... 214/10,
  198/9, 198/36
[51] Int. Cl. .................................... B65g 65/28
[50] Field of Search .......................... 214/10,
  17.82, 17.84, 16; 198/9, 10, 36, 140, 145

[56] References Cited
UNITED STATES PATENTS
439,487 10/1890 Dodge ........................ 198/36

654,455 7/1900 Hulett ........................ 214/10
1,457,794 6/1923 Piper ........................ 214/17.84 UX
3,011,658 12/1961 Peterson ........................ 214/10

Primary Examiner—Gerald M. Forlenza
Assistant Examiner—Frank E. Werner
Attorney—Wells and St. John

ABSTRACT: A reclaiming apparatus having a rigid elongated framework movable toward an exposed face of a storage pile containing bulk material such as sawdust or wood chips. At the lower portion of the framework are flexible sweeps that engage the base of the storage pile. Each sweep is free at its trailing end and has its leading end pulled about the framework along a concave path that is directed toward the exposed face of the pile. The moving sweeps extend outward from the framework to undercut the base of the pile. The automatically work along the lower edge of the pile to remove material therefrom.

BULK MATERIAL RECLAIMING APPARATUS

BACKGROUND OF THE INVENTION

The present disclosure relates to the reclaiming of bulk materials, particularly sawdust and wood chips. Such materials are stored in large quantities at lumber mills and pulp or paper facilities. Because of the organic nature of wood chips, they decompose with age. It is advisable to remove from the pile those chips that have been stored for the greatest amount of time. Present practice is generally restricted to the use of manually operated tractors with a blade that pushes the wood chips from place to place. The weight of the tractor causes chip breakage and produces more fines than is desirable in a pulp process. This procedure also makes it most difficult to insure the progressive removal of chips in the order received into the pile.

One difficulty inherent in the reclaiming of such bulk material is its ability to be compacted into formations that involve little or no vertical support at the base of the formation. Sawdust and wood chips can span a considerable distance at the pile base by forming bridges or arches supported only at widely spaced points. Such formations are always susceptible to collapse, which endangers both conventional machinery and those operating it.

The general arrangement of devices for storing and reclaiming material in bulk form as utilized in this disclosure is shown in prior art patents. An example of an annular storage arrangement with a reclaiming apparatus at the pile base, wherein the reclaimer is radial and moves about a pile, is illustrated in U.S. Pat. No. 502,555 to Dodge, granted Aug. 9, 1893. An example of an elongated pile storage arrangement with a transverse base conveyor is illustrated in the Messiter U.S. Pat. No. 677,677, granted July 2, 1901. In each of these disclosures, the reclaiming apparatus comprises a horizontal toothed conveyor designed to continuously dig along the base of the pile and cause the particles in the pile to move downward along the angle of repose for the particle material.

The difficulty with such devices is that they do not lend themselves to the handling of fine materials such as sawdust and wood chips, which become tightly packed in storage A storage pile of such materials does not necessarily collapse at a uniform rate as the base of the pile is undercut. It is therefore necessary to provide a reclaiming apparatus that is capable of undercutting the pile as necessary to insure the progressive collapse of the pile face, while at the same time insuring that the extended machinery will not be damaged by such collapse and will automatically adapt to the changing condition of the pile when such collapse does occur. Without the ability to undercut the pile and to then adapt to the new base boundary of the pile, any reclaiming apparatus moving along the pile will eventually either be stopped by material above that which was undercut, or will simply move into the pile and leave material untouched above and to the rear of it.

The structure disclosed herein is a modification of a prior reclaiming structure shown in U.S. Pat. No. 3,011,658, granted to John L. Peterson on Dec. 5, 1961. In the Peterson patent a rotatable peripheral ring pulls a number of flexible sweeps across the floor of the storage area. These sweeps operate automatically against the lower edge of a central pile and remove sawdust or other material in a continuous and metered procedure.

While very effective for material handling, the Peterson structure does not necessarily remove from the pile the first material delivered to it. If the pile does not extend to the outside of the ring structure, the newest material dumped at the top of a conical pile will slide downwardly along the outside of the pile and be next removed by continued rotation of the ring. If material is constantly being supplied to the pile, the oldest material at the center of the pile base might not be removed until the structure is entirely emptied.

According to the present invention, the flexible sweeps are mounted on a specially designed movable framework that is carried on the supporting surface for the pile and moved toward an exposed pile face. The sweeps operate across the face and are pulled in such fashion as to work inwardly against the exposed pile face to undercut the pile across the base of the exposed face. Subsequent collapse of the portions of the pile directly above the sweeps automatically results in their being moved back toward the framework under an escape area shielded from the weight of the pile. In this manner, the sweeps operate progressively along the length of the pile, which can be formed in any desired elongated shape, including an annular shape when so desired.

SUMMARY OF THE INVENTION

The invention comprises a bulk material reclaiming apparatus having an elongated framework that extends across one face of a bulk storage pile, the framework being movably supported for movement toward the face of the pile. A plurality of elongated sweeps are pulled across the framework and can move outwardly for dragging engagement across the bottom of the pile face. Powered means is mounted on the framework and connected to each sweep assembly for moving it along the framework with one end carried along a concave path directed toward the face of the pile and its remaining end being free.

It is a first object of this invention to provide an apparatus for reclaiming bulk material from large storage piles which can effectively remove material from the pile in the same order in which it is received at the pile.

Another object of this invention is to provide a relatively simple mechanical structure for effectively reclaiming bulk material that is capable of forming compacted structures with little base support. The apparatus is capable of working continuously across the base of an exposed pile face and adjusting automatically to work against the edge of the pile following collapse of material located above it.

These and further objects will be evident from the following disclosure, which discusses the essential characteristics of the structure and several variations in structural arrangement and utilization.

PREFERRED FORM OF THE INVENTION

Figure 1:
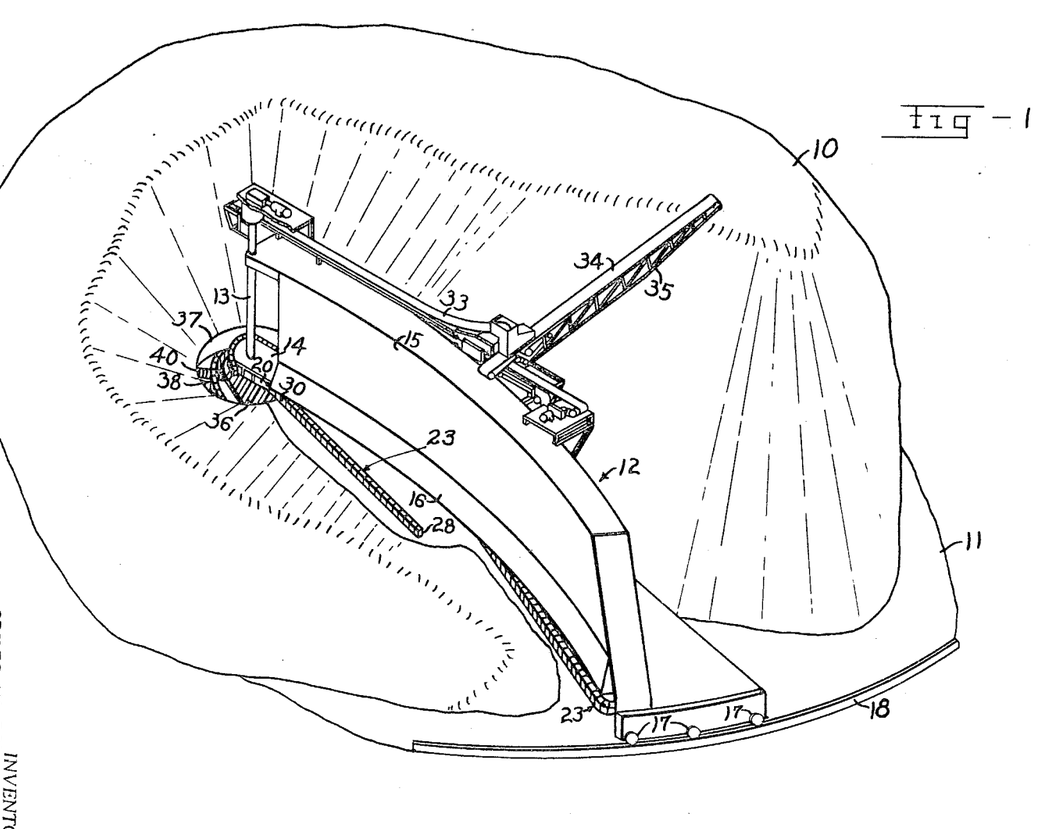
FIG. 1 is a schematic perspective view of a first form of the invention.
Figure 2:
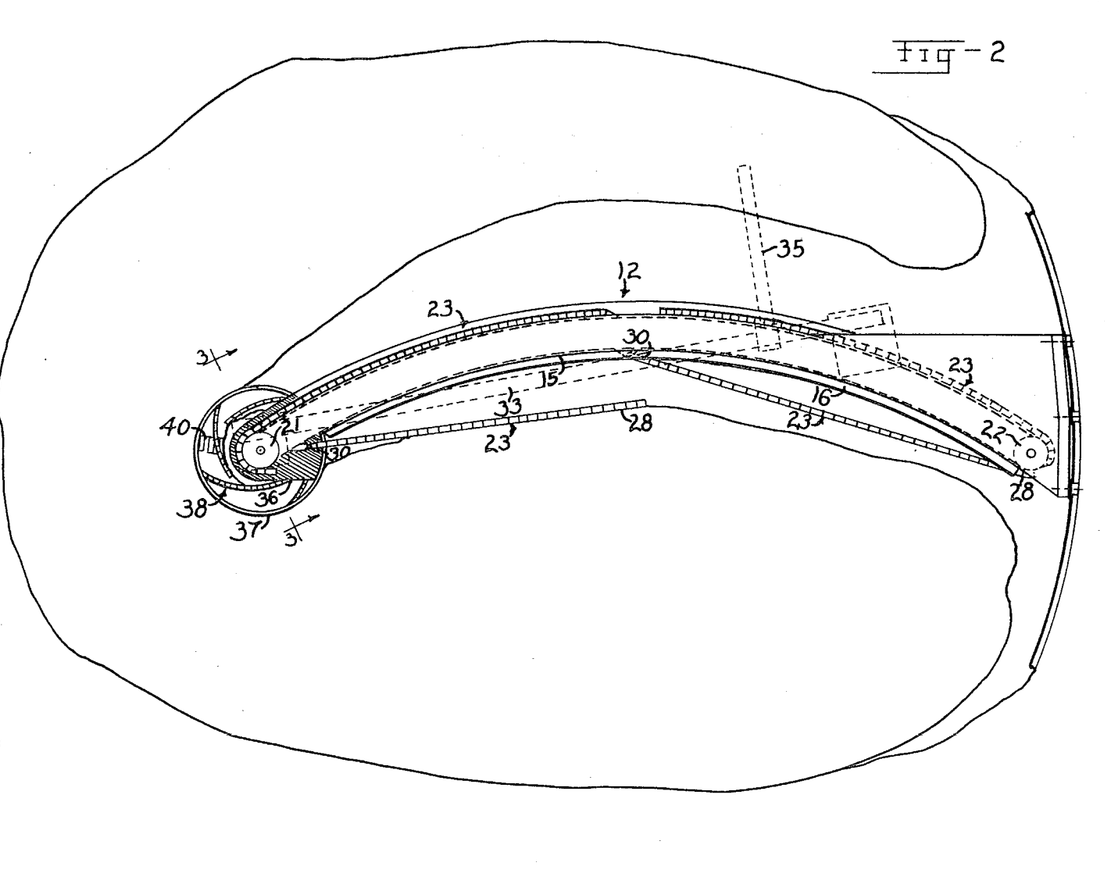
FIG. 2 is a top view of the reclaimer apparatus shown in FIG. 1.
Figure 3:
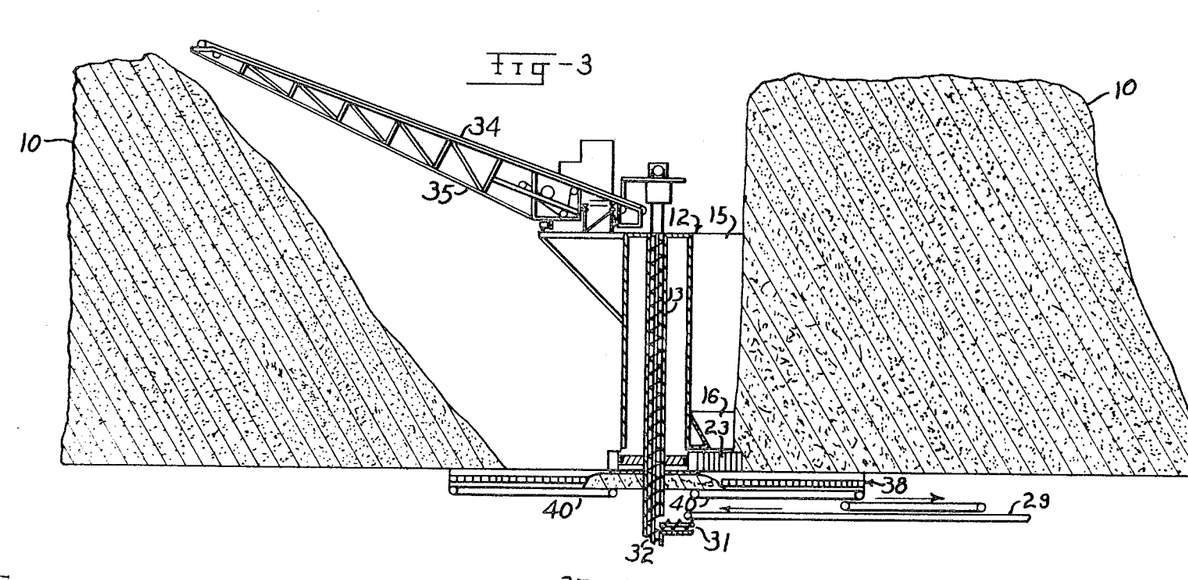
FIG. 3 is a vertical sectional view taken through the center of the apparatus in FIGS. 1 and 2.

The drawings annexed to this description illustrate several physical arrangements of a storage pile for wood chips or sawdust or similar materials and the reclaimer apparatus that is the subject matter of this disclosure. In FIGS. 1, 2 and 3, the pile is in the form of an annular configuration or "doughnut" shape. Material enters the pile behind the reclaimer apparatus and is removed from the pile along its working face. The reclaimer apparatus pivots at the center of the pile and continuously rotates in one direction toward an exposed pile face. In FIGS. 7 through 12, the pile is in the form of one or more straight elongated configurations, and the reclaimer apparatus moves in a straight-line path toward an exposed pile face, the pile generally being formed behind the reclaimer apparatus as it moves relative to the pile. While several different arrangements have been illustrated, they are not contemplated as being exhaustive of the many possibilities available to the designer of bulk material devices using the instant reclaimer apparatus.

Taking first the embodiment of the invention illustrated in FIGS. 1 through 3, the reclaimer apparatus is shown in conjunction with an annular pile of bulk material, generally designated by the numeral 10. The pile 10 is only partially illustrated in the drawings. It is preferably formed in a discontinuous circular shape. It might have a triangular cross section in instances where material is dumped onto the pile along a purely circular path. It might alternately have a trapezoidal cross-sectional configuration at each of its sides where material is also distributed radially as well as along such a circular path.

The pile 10 is illustrated as being located on a slab 11 having a generally horizontal flat upper surface on which the pile 10 is supported. The upper surface of slab 11 can be slightly crowned for drainage. While the slab 11 will generally be surfaced with concrete, asphalt or other conventional surfacing material, the term "slab" as used herein is intended to include any suitable surface regardless of material. It is not intended to exclude a properly prepared base made of soil available at the site.

The apparatus generally comprises an elongated framework 12 which is pivoted about a vertical axis of a tube 13, the tube 13 being suitably anchored in an upright position at the center of pile 10. The framework 12 includes a lower operating section 14 and an upwardly extending bulkhead 15, the forward face of the bulkhead 15 being concave in a horizontal plane. The lower edge of bulkhead 15 terminates in a forwardly extending shield 16 which also has a horizontally concave configuration along the length of the framework 12. Shield 16 provides a protected escape area along the forward face of the operating section 14. The outer end of framework 12 is shown generally supported by a series of wheels 17 which ride along a circular track 18 on the slab 11. The wheels 17 are powered by a conventional motor located on the framework 12 and not illustrated in the schematic drawings.

A continuous powered chain 20 is wrapped about the operating section 14 of the framework 12. It is guided by conventional chain bearing members so as to follow a concave path conforming to the configuration of the forward face of framework 12. The path of chain 20 is generally indicated in FIG. 2 by a dashed line. At the respective ends of the framework 12, chain 20 is wrapped about conventional rotating sprockets 21, 22, one of which is powered by a motor (not shown) or other conventional powered devices. Chain 20 normally moves at constant rate of speed during operation of the apparatus.

Figures 4, 5:
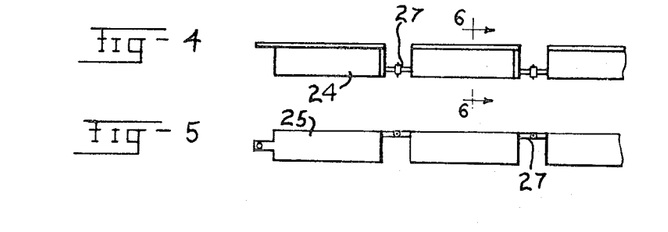
FIG. 4 is a fragmentary elevation view of one sweep assembly.
FIG. 5 is a top view of the structure shown in FIG. 4.
Figure 6:
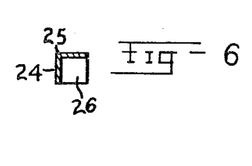
FIG. 6 is a sectional view taken along line 6–6 in FIG. 4.

A series of sweeps are movably connected to chain 20 and operate in the general fashion shown schematically in FIG. 2. Each sweep 23 includes a string of buckets or other flexibly connected elements capable of dragging along the surface of slab 11 and working against the edge of pile 10 along the face adjacent to the forward portion of framework 12. The nature of the sweeps 23 is generally disclosed in U.S. Pat. No. 3,011,658. As shown in FIGS. 4, 5 and 6, each bucket normally includes a rear wall 24, an upper wall 25 and a perpendicular end wall 26, which together partially enclose an area in which chips, sawdust or other bulk particle material can be dragged across the surface of slab 11. The buckets are pivoted to one another by pins shown generally at 27 which permit each bucket to pivot relative to the adjacent buckets about parallel vertical axes.

The buckets in each sweep 23 are in the form of a flexibly connected string, the outer end 28 of the string being free and the inner end 30 being pivotally connected to chain 20. This pivotal connection is also about a vertical axis. Each bucket of each sweep 23 is therefore free to move horizontally relative to the other buckets and relative to chain 20. As seen in FIG. 2, the sweeps 23 are also free to move forwardly from the framework 12 in response to he various forces exerted thereon.

While the present disclosure is not particularly concerned with the manner in which the material is fed onto pile 10, one possible example is illustrated in FIGS. 1 and 3. As shown, material coming to the pile is carried on a subsurface horizontal conveyor 29 to a horizontal auger 31 that leads to a vertical auger 32 located within the tube 13. At its upper end, auger 32 discharges material onto an extensible horizontal conveyor 33 along the top of framework 12. The conveyor 33 discharges onto a rearwardly protruding conveyor 34 located on a rearwardly extended boom 35. The boom 35 is movable across the length of the framework 12 so as to be capable of spreading material radially with respect to the center of the pile 10. In this manner, incoming material can be spread across a relatively wide annular pile configuration.

The reclaimer apparatus normally will operate in a continuous fashion, the wheels 17 being slowly driven to constantly move framework 12 toward the exposed face of pile 10 from which material is to be removed. As shown in FIG. 3, the sweeps 23 will undercut the exposed face of pile 10. The material above sweeps 23 will tend to be compacted and often can remain in packed upright wall configuration for a considerable time despite the removal removal the base material. However, the lack of support will eventually cause the exposed face of pile 10 to collapse and loose material will then fall upon the sweeps 23. When this occurs, the sweeps 23 will be pulled from the loose material by continued movement of chain 20 along framework 12 and will drag against the lower edge of the pile as they again traverse the changing pile shape.

The free ends 28 of sweeps 23 will normally drag along the surface of slab 11 across a path that is forward of the path of the controlled end 30 of each sweep 23. The nature of the path is controlled by the frictional forces and other forces exerted on the sweeps 23. The extension of sweeps 23 results from the concave path along which each sweep is pulled. Sweeps 23 are capable of retracting rearward toward the framework 12 due to the resistance offered by engagement against the lower edge of pile 10. In order to be certain that sweeps 23 can always work against the lower edge of pile 10, sweeps 23 are provided with an escape area beneath the shield 16, wherein they are protected from the weight of the pile when the pile rests against the bulkhead 15.

Each bucket within each sweep 23 will normally remove material from the pile 10 and drag this material across the surface of slab 11 toward the inner end of framework 12. A rigid grate or grizzly 36 is fixed to framework 12 at its inner end. The upper surface of grate 36 is preferably flush with the upper surface of slab 11, and is located within a circular recess shown at 37. The material dragged along by the buckets can fall trough the open spaces afforded by grate 36 and are thereby received through opening 37.

In the example shown, a reclaiming apparatus generally designated at 38 is located within the opening 37. The reclaiming apparatus 38 is of the type described in U.S. Pat. No. 3,011,658, and serves to feed the material to another recessed horizontal conveyor 40 that carries material away from the locality of pile 10. The nature of the receiving conveyor apparatus is not critical to the operation of the instant reclaimer for pile 10 and can be alternately any conventional or known receiving structure, such as a hopper, or a simple conveyor mechanism.

While the apparatus shown in FIG. 1 illustrates the reclaimer in conjunction with an apparatus for delivering material onto pile 10, the two can be entirely separate and it is not intended that the instant reclaiming apparatus be in any way restricted with respect to the type of structure that feeds material to pile 10.

The essential nature of the reclaiming apparatus concerns the use of a movable elongated framework 12 that can be moved toward an exposed face of an elongated pile of particles. Along the bottom of the framework 12 is a concave path for a flexible drive mechanism that pulls the flexible sweeps 23 frictionally along the upper surface of slab 11. The sweeps 23 are therefore capable of extending forwardly from the material 12 to undercut the base of the pile and insure proper removal of material.

While the sweeps 23 obviously cannot extend outward from framework 12 the same amount across the entire length of the framework 12, the amount of extension is generally controlled by the degree to which the path of the driving flexible member is concave. In general, the allowable extension of each sweep 23 will be less at the end of framework 12 and greatest at its center. This relative amount of extension will generally conform to the amount of undercutting needed to properly operate against the pile 10, since the pile 10 is a freestanding form will generally be tallest at its center and will diminish in height toward its respective side edges. In the case of a pile confined by upright walls, it would be necessary to support the walls by outwardly offset arches and to extend the reclaimer framework beyond each wall an amount adequate to insure proper extension of the sweeps 23 between the wall confines.

Figure 7:
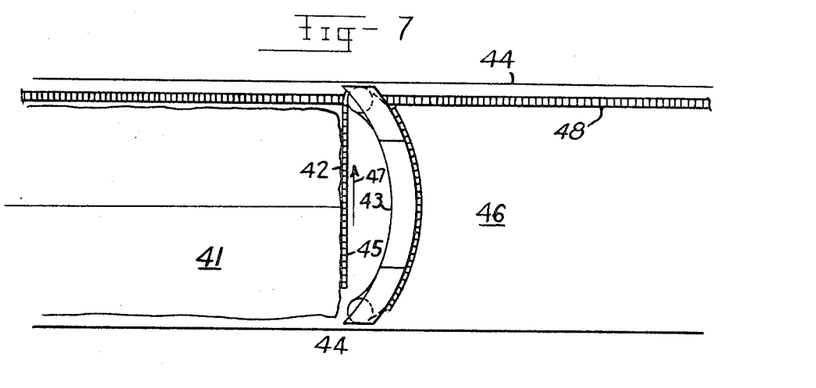
FIG. 7 is a schematic top view of a second embodiment of the invention designed for operation against a straight elongated pile.
Figure 8:
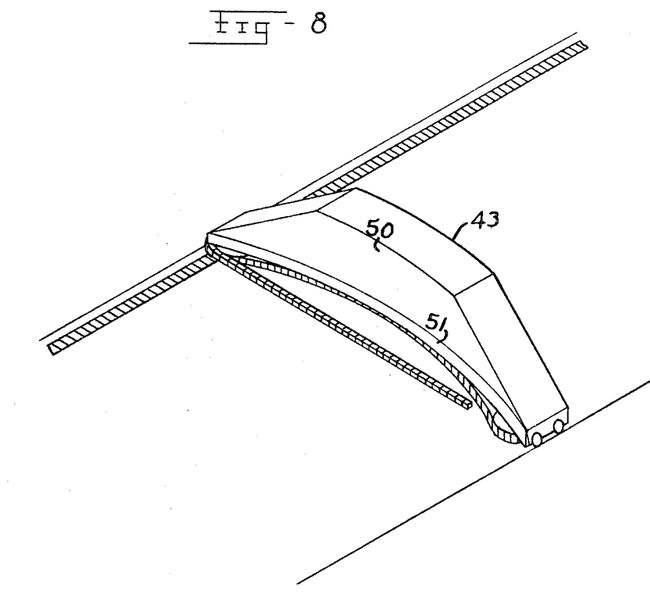
FIG. 8 is a schematic perspective view of the apparatus shown in FIG. 7.

FIGS. 7 and 8 illustrated a simple adaptation of the apparatus to a straight line pile. Pile 41 includes an exposed face 42 against which the reclaimer apparatus constantly works. The reclaimer framework is shown at 43, being supported by longitudinal tracks 44 at the respective sides of pile 41. The parallel tracks 44 guide the framework 43 in a direction parallel to the length of pile 41. The previously described sweeps 45 are pulled across framework 43 along the supporting slab surface 46 in the manner discussed above and work against the base of pile 41 to constantly remove material therefrom. The forward end of each sweep 45 is pulled along a horizontally concave path across the front of framework 43 in a direction shown by arrow 47. The sweeps 45 drag material from the base of pile 41 across a recessed receiving conveyor structure shown at 48. The conveyor structure at 48 utilizes a conventional grate having an upper surface flush with the surface of an elongated slab 46. The loose material drops through the grate and onto a conventional longitudinal conveyor, which might be in the form of a belt, screw or other type of conveying apparatus.

FIG. 8 shows a simplified schematic drawing of the apparatus in FIG. 7 without illustrating the pile. The framework 43 is provided with a forward bulkhead 50 and lower shield 51 to protect the operating elements from the force of the pile in the manner discussed above.

Figure 11:
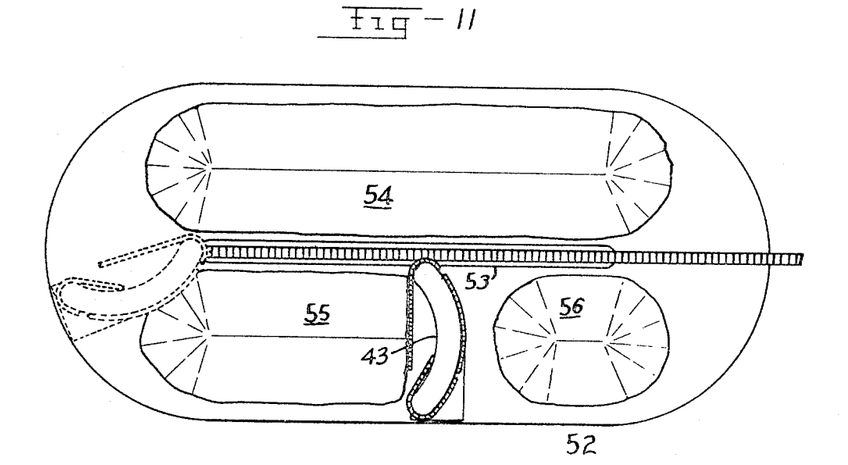
FIG. 11 is a schematic top view of an apparatus designed for use in conjunction with two parallel elongated piles.

When using the structure shown in FIG. 7, the reclaiming apparatus must be returned to its initial starting position with respect to the pile 41 in order to achieve a "first-in first-out" bulk storage and reclaiming operation. In FIG. 11 is illustrated one manner in which this can be achieved without idle return movement of the reclaimer apparatus. The framework 43 is carried on an outer oval track 52 and an inner oval track 53 which permit the framework 43 to pivot 180° at the end of its longitudinal travel. In this instance, the apparatus would operate alternately along a pair of elongated piles. A complete pile is shown at 54. At 55 is shown a portion of a parallel pile against which the reclaimer is operating. At 56 is shown a pile being formed by material being delivered thereto. The manner by which the material is being delivered to the portion of the pile at 56 is not a part of the present disclosure and any conventional apparatus for this purpose can be used. By utilizing the arrangement shown in FIG. 11, a single reclaimer apparatus can operate on two elongated piles, and can always work against the face of the piles containing the oldest material delivered thereto. This arrangement eliminates any wasted movement of the framework in returning to a starting position as would be necessary with respect to operation on a single straight pile.

Figure 9:
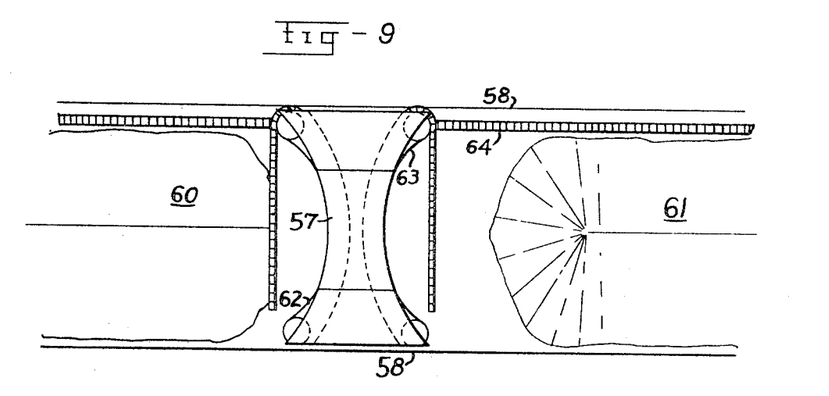
FIG. 9 is a schematic top view of another embodiment of the invention designed for use with a straight elongated pile.
Figure 10:
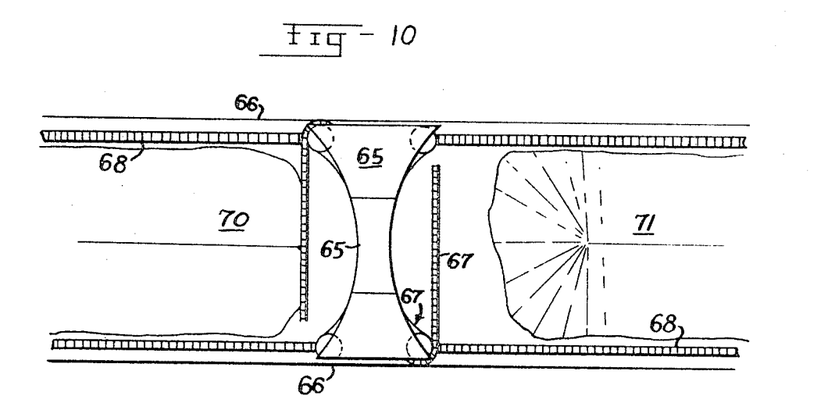
FIG. 10 is a view similar to FIG. 9 illustrating another embodiment of the invention.

FIGS. 9 and 10 illustrate modifications wherein the structure is double-ended. In FIG. 9 there is provided alternately operating sweep assemblies mounted on a framework 57 that is carried by parallel tracks 58. Two storage piles are shown at 60 and 61. At each side of framework 57 in an identical sweep mechanism of the type previously discussed, the sweep assembly 62 being operated when the framework 57 is moving forward to the pile 60 and the sweep assembly 63 being operated when the framework 57 is moving toward the pile 61. In this particular arrangement, a single receiving conveyor 64 is illustrated, the conveyor assembly 64 being recessed as previously discussed and extending along one side of the pile 60, 61.

FIG. 10 shows a modification of the structure in FIG. 9. In this instance, the framework 65 again is supported by parallel side tracks 66. However, only a single sweep assembly 67 is provided, the flexible driving chain or member being carried along a concave path at both sides of framework 65. A pair of recessed longitudinal receiving conveyors 68 are provided, one being adapted to receive material when framework 67 is moving toward the portion of the pile designated at 70 and the other being adapted to receive material when the framework 65 is moving in the opposite direction toward the portion of the pile shown at 71. Again, this type of apparatus probably would not lend itself to a "first-in first-out" operation.

Figure 12:
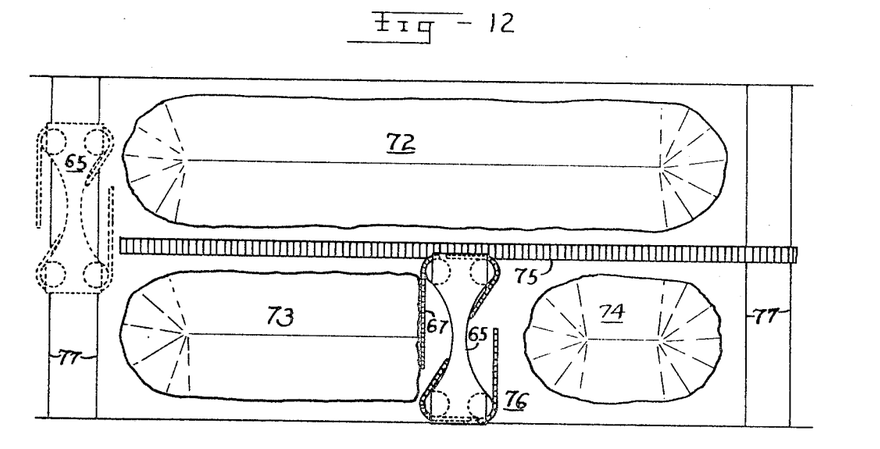
FIG. 12 is a view showing owing a modification of the structure in FIG. 11.

One manner in which the double-ended reclaiming apparatus can be used in a "first-in first-out" pile handling procedure is shown in FIG. 12 wherein the framework 65 shown in FIG. 10 is illustrated as being supported by parallel tracks along two elongated piles. One complete pile is shown at 72. A partial section of the other pile is designated at 73. This section of the pile is being worked upon by the sweep assembly 67, which moves the removed material to a recessed conveyor at 75. A second portion of this pile is shown in 74, this being the portion in which material is progressively received into the storage area on a common slab 76. At the respective ends of the two piles are perpendicular track assemblies generally shown at 77. The framework 65 can be shifted transversely on the tracks 77 to position framework 65 for engagement against whichever of the pile sections is to be worked upon. This particular arrangement lends itself to considerable versatility, since the double-ended sweep assembly 67 can operate in either direction of movement of framework 65, and can be used to repeatedly act against a single pile or to progress about the two piles as desired.

It is apparent that the general description of the several modifications shown herein is not exhaustive. The piles need not be perfectly circular or perfectly straight. The present apparatus can obviously be mounted on tracks or can be self-supported by wheels or other movable members to operate directly on the slab surface. The capacity of the apparatus is generally unlimited and can be adapted to very large installations such as the chip piles required to supply a modern pulp or paper mill. The precise manner by which the elongated framework is supported or guided is not of particular importance, since the concept involved herein is primarily the relationship of the framework to the pile and the manner by which the unique sweeps are moved across the face of the pile to constantly undercut the pile base.

The piles illustrated are not illustrated as being confined by vertical walls in the supporting structure, but such walls can be provided when desired. The piles can either be free standing without any support other than a horizontal slab, or can be within a partial or complete supporting enclosure. The storage pile and associated reclaimer apparatus can be located in a stationary position or can be mounted upon a vehicle or vessel such as a transport ship for the bulk material.

Having thus described our invention, we claim:

1. An apparatus for removing bulk material from a storage pile, comprising:
    a rigid elongated framework adjacent to the pile;
    means operatively connected to said framework for selectively moving said framework relative to the pile;
    elongated sweep means for engaging the pile and removing material therefrom;

and powered motion transmitting means on said framework operatively connected to one end of said sweep means for pulling said one end about said framework along a horizontal concave path facing toward the pile.

2. An apparatus as set out in claim 1 wherein said sweep means comprises a string of open buckets joined to one another about upright axes and frictionally resting on the supporting surface for the pile.

3. An apparatus as set out in claim 1 wherein said motion transmitting means comprises an endless flexible driven member movably supported on said framework with said sweep means extending outwardly therefrom.

4. An apparatus as set out in claim 1 wherein said motion transmitting means comprises an endless flexible driven member movably supported on said framework;
said sweep means comprising a string of open buckets joined to one another about upright axes and frictionally resting on the supporting surface for the pile, said string of open buckets being extended outwardly from said driven member.

5. An apparatus as set out in claim 1 wherein said motion transmitting means comprises an endless flexible driven member movably supported on said framework for motion along a horizontally concave flight facing toward the pile in the direction of movement of the framework relative to the pile;
said sweep means comprising a string of buckets trailing from said one end of said sweep means in response to movement of said driven member relative to said framework.

6. An apparatus for removing bulk material from a storage pile, comprising:
a slab having an upwardly facing surface on which the pile is situated in an elongated configuration;
an upright elongated framework spanning an exposed face of the pile, said framework being movably mounted on the slab surface for movement along the pile;
a flexible driven member movably mounted to the framework adjacent to the slab surface in an endless path, the portion of said path adjacent to said exposed face of the pile having an arcuate concave configuration in a horizontal plane;
and sweep means pulled about the framework by said driven member for dragging engagement against the lower portion of the exposed face of the pile, said sweep means having one end thereof pivotally connected to said driven member about an upright axis.

7. An apparatus as set out in claim 6 wherein said sweep means comprises a string of open buckets joined so as to permit relative horizontal movement of one bucket relative to the others and to said driven member.

8. An apparatus for removing bulk material from an elongated storage pile, comprising:
a rigid elongated framework extending across one face of the pile and movably supported for movement relative to the pile toward said one face;
endless motion transmitting means on said framework mounted for movement lengthwise of the framework along that portion of the framework facing said one face of the pile;
elongated sweep means for engaging the bottom of the pile across said one face of the pile;
said sweep means being operatively connected at one end thereof to said motion transmitting means for horizontal movement of said one end along an arcuate concave path lengthwise of the framework along that portion of the framework facing said one face of the pile; the remaining end of said sweep means being extended from the path toward the pile.

9. An apparatus as set out in claim 8 wherein said sweep means comprises:
a plurality of buckets pivotally interconnected to one another in a chain, each of said buckets having an open configuration facing said pile face while in engagement therewith.

10. An apparatus as set out in claim 8 wherein said framework further comprises:
an upright bulkhead facing said exposed pile face and having an arcuate concave surface extending transversely across and opposed to said pile face.

11. An apparatus as set out in claim 10 wherein said framework further comprises:
a protruding shield extending across the framework along the lower edge of the concave surface of said bulkhead at an elevation immediately above said sweep means, said shield protruding outwardly from the bulkhead toward said pile face, whereby said sweep means can be positioned beneath the shield due to the dragging pressure thereof against said pile face.

12. In an apparatus for removing particulated material from a bulk storage pile:
a support surface on which the storage pile rests;
outfeed conveyor means recessed beneath the support surface and leading outward therefrom;
and reclaiming means for transferring material from the pile to said outfeed conveyor means, said reclaiming means comprising:
an upright bulkhead having a transversely concave face; extending upwardly therealong from an elevation adjacent to said support surface;
means on said bulkhead movably mounting said bulkhead upon said support surface for causing the bulkhead to selectively traverse the support surface;
endless flexible motion transmitting means movably carried on said bulkhead along a horizontal path adjacent to said support surface and having a configuration across said concave surface which is also transversely concave;
and sweep means movably connected to said motion transmitting means and extending outward therefrom along said support surface for engagement against the lower face of the storage pile during movement across the concave bulkhead face.